BIGARD, KELLOGG, & PRENTISS.
Churn.
No. 99,819. Patented Feb. 15, 1870.
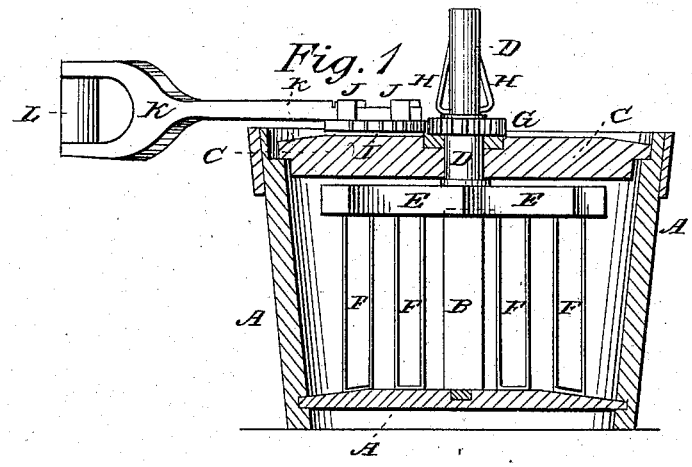
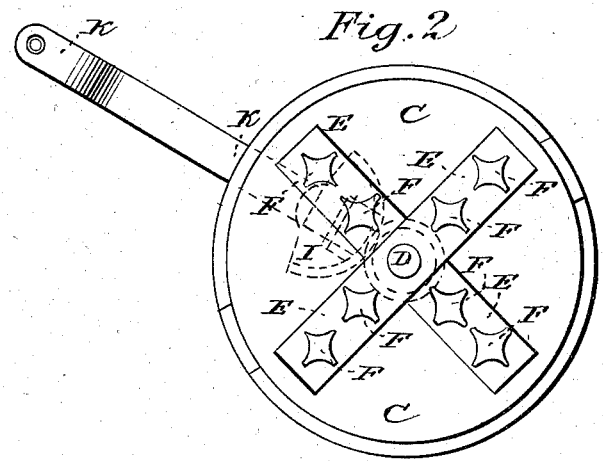
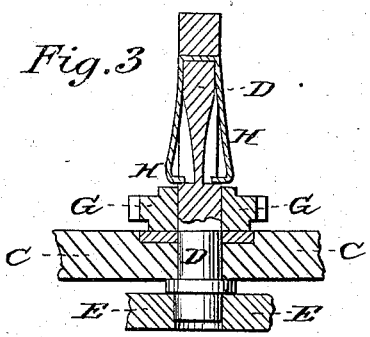
Witnesses:
Geo. H. Mabel
Jno. E. Brooks
Inventors:
H. H. Bigard.
N. A. Prentiss.
E. H. Kellogg.
per Munn & Co.
attorneys

United States Patent Office.

H. H. BIGARD, E. H. KELLOGG, AND N. A. PRENTISS, OF FOWLER, NEW YORK.

Letters Patent No. 99,819, dated February 15, 1870; antedated February 14, 1870.

IMPROVEMENT IN CHURNS.

The Schedule referred to in these Letters Patent and making part of the same.

*To all whom it may concern:*

Be it known that we, H. H. BIGARD, E. H. KELLOGG, and N. A. PRENTISS, of Fowler, in the county of St. Lawrence, and State of New York, have invented a new and useful Improvement in Churns; and we do hereby declare that the following is a full, clear, and exact description thereof, which will enable others skilled in the art to make and use the same, reference being had to the accompanying drawing, forming part of this specification, in which—

Figure 1 is a detail vertical section of my improved churn.

Figure 2 is an under side view of the dasher, cover, and handle.

Figure 3 is a detail sectional view of the upper part of the dasher shaft and its attachments.

Similar letters of reference indicate corresponding parts.

Our invention has for its object to furnish an improved churn, simple in construction and effective in operation, doing its work quickly and well; and It consists in the construction of various parts of the churn, as hereinafter more fully described.

A represents the body of the churn, which may be of any desired form, preferably cylindrical, and of any desired capacity.

To the center of the bottom of the churn A is attached a square post, B, having a rounded or convex top, and of such a height as to not quite touch the dasher when being operated.

C is the cover, which fits closely into a rabbet in the mouth of the churn A, as shown in fig. 1. In the opposite edges of the cover C are formed notches, which fit upon ears or projections formed upon or attached to the rabbeted mouth of the churn, to prevent the said cover from moving while the churn is being operated.

D is the dasher shaft, which passes down through a hole in the centre of the cover C, and to the lower end of which are securely attached two bars, E, crossing each other at right angles at their centers.

To each arm of each of the bars E are attached the upper ends of the beaters F, which are made of such a length as to reach nearly to the bottom of the churn A, and which are made in the manner shown in figs. 1 and 2—that is to say, the sides of square timbers of suitable size and length are plowed or grooved longitudinally with a round groove, as shown in figs. 1 and 2, and are arranged diagonally with the length of the bars F, as shown in fig. 2, so that as the dasher is revolved, the forward angle or edge of the beaters F may divide the cream which the grooved sides of said beaters project, the one toward the sides of the churn A and the other toward the center post B, throwing the said cream into violent eddies and currents, which are interrupted and broken up, bringing the butter in a very short time.

The part of the dasher shaft D just above the cover C is made square, and upon the said square part is fitted the gear-wheel G, so that the said gear-wheel may carry the said dasher shaft D with it in its revolution, and so that the said gear-wheel may be conveniently detached when it is desired to remove the cover C.

The gear-wheel G is kept in place upon the dasher shaft D by the spring catches H attached to the upper end of the said shaft, and which are pressed into recesses in the said shaft D when it is desired to remove the wheel G.

I is a gear-wheel or the segment of a gear-wheel, which is pivoted at its centre to the cover C, in such a position that its teeth may mesh into the teeth of the detachable gear-wheel G.

To the upper side of the gear-wheel I are attached two keepers, J, into which fits the inner end of the lever-handle K, the outer end of which is enlarged and branched, and has a roller, L, pivoted between the ends of the said branches, as shown in figs. 1 and 2, for convenience in grasping and operating it.

In using the churn the outer end of the lever-handle is moved back and forth horizontally, which revolves the dasher first in one direction and then in the other, bringing the butter in a very short time.

Having thus described our invention,

What we claim as new, and desire to secure by Letters Patent, is—

1. The combination of the springs H with the recessed shaft D, whereby the loose spur-wheel G is rendered easily removable and the top readily withdrawn.

2. The combination of a series of four-sided beaters with concave faces, arranged upon arms perpendicular to and intersecting each other at their centers, and with points or corners which pierce and divide the cream as they pass through their planes of rotation.

H. H. BIGARD.
E. H. KELLOGG.
N. A. PRENTISS.

Witnesses:
O. L. WIGHT,
ALBERT SIBLEY.